May 3, 1960

A. MARTIN 2,935,012

COFFEE BREWER

Filed Oct. 8, 1958

INVENTOR.
Alan Martin
BY
Ezekiel Wolf, Wolf & Greenfield
attys

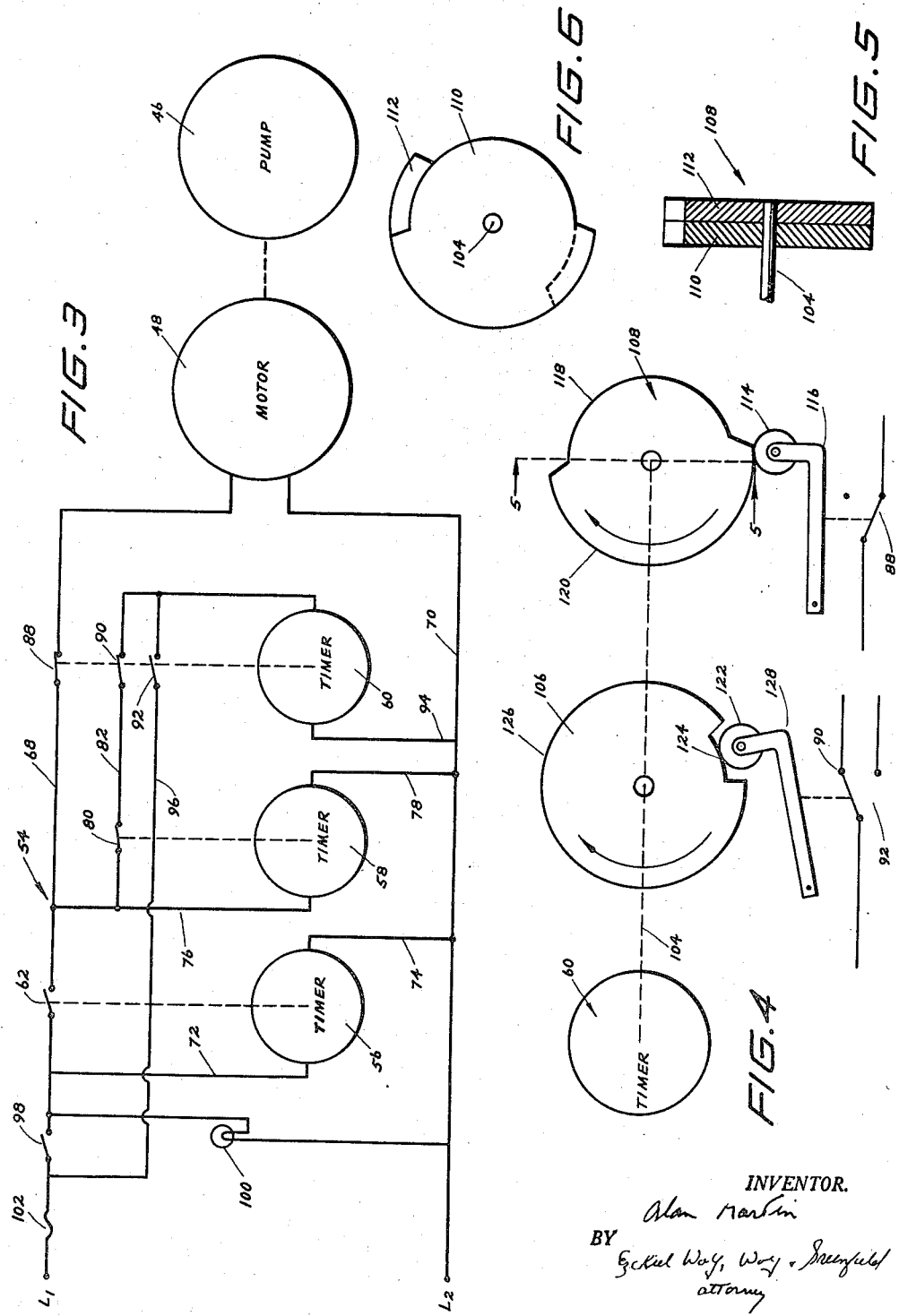

United States Patent Office 2,935,012
Patented May 3, 1960

2,935,012

COFFEE BREWER

Alan Martin, Sharon, Mass.

Application October 8, 1958, Serial No. 766,061

8 Claims. (Cl. 99—283)

This invention relates to the art of coffee making and more particularly comprises a new and improved brewing device for automatically controlling the processing of coffee in urns or other large coffee making machines.

Although several control devices for brewing coffee in large quantities have appeared on the market in recent years, none of them have gained wide acceptance. As a result, it is still the practice in most commercial establishments to pour water by hand through the ground coffee beans. Those in charge of the making of the coffee periodically drain water from the bottom of the container and pour it into the coffee bag adjacent the top, using large pitchers for this operation. This water ordinarily is at or above boiling temperature and constitutes a hazard to the operator. Only after considerable practice is the operator capable of making good coffee in this manner for only through experience will the operator learn how many pitchers of water should be poured through the coffee and at what intervals. Even though this skill may be acquired with experience, nevertheless, unless the operator gives this task his full attention, good coffee will not regularly result from his efforts.

The primary object of my invention is to provide a machine which automatically directs boiling water through the coffee bag at preselected intervals.

Another important object of my invention is to provide a completely portable device for this purpose and which can process coffee at a much greater speed than is possible through manual operations.

Still another important object of my invention is to provide a device of this character which may be connected to any of several coffee makers in a cafeteria, restaurant, etc., and further may be adjusted readily so that it may be used with coffee makers of different sizes.

Yet another important object of my invention is to eliminate completely the dangers to the operator normally incident to the making of coffee manually.

A further object of my invention which is of utmost importance is to provide a machine which assures the consistant brewing of excellent coffee.

To accomplish these and other objects, my invention is embodied in an attractive case supported on a movable frame which may be wheeled to any desired location. The case contains a motor driven positive displacement pump having an inlet adapted to be connected to the outlet spicket of the coffee making urn or tank and an outlet adapted to be connected to the top of the urn or tank, above the coffee bag. An electrical circuit which contains a plurality of timers controls the operation of the motor which drives the pump so that the device may be set to direct water to the urn at preselected intervals. One timer is set to govern the full brewing period, a second timer controls the duration of operation of the pump to fill initially the coffee bag, and a third timer in the system cycles continuously following the expiration of the initial period for filling the coffee bag, to the end of the full brewing period.

The second and third timers cause the pump to satisfy two major requirements for the brewing of good coffee. One of these requirements is that the ground coffee beans be completely saturated. When the beans are saturated, the flavor is extracted evenly from all of the ground coffee and all of the coffee grounds are utilized. The second timer causes the pump to run the period necessary to obtain full saturation.

A second important requirement is that the water be poured through the ground coffee to satisfy the desired formula. That is, the water should be circulated through the ground coffee the desired number of times. Normally, the formula will call for the water to circulate once or one and one half times through the ground coffee. Thus, if 20 gallons of coffee are to be made and the latter formula is used, 30 gallons must be circulated through the ground coffee. Therefore, if 8 gallons of water initially saturate the coffee bag, under the action of the pump controlled by the second timer, the third timer must cause an additional 22 gallons to filter through the ground coffee.

These and other objects and features of my invention along with its incident advantages will be better understood and appreciated from the following detailed description, read in connection with the accompanying drawings, in which:

Figure 3 is a schematic diagram of the controller;

Figure 4 is a diagrammatic view of one of the timers employed in the embodiment of Figure 3;

Figure 5 is a cross sectional view taken along the section line 5—5 of Figure 4; and Figure 6 is an elevation view showing an alternative position for one of the cams of Figure 4.

Figure 1:
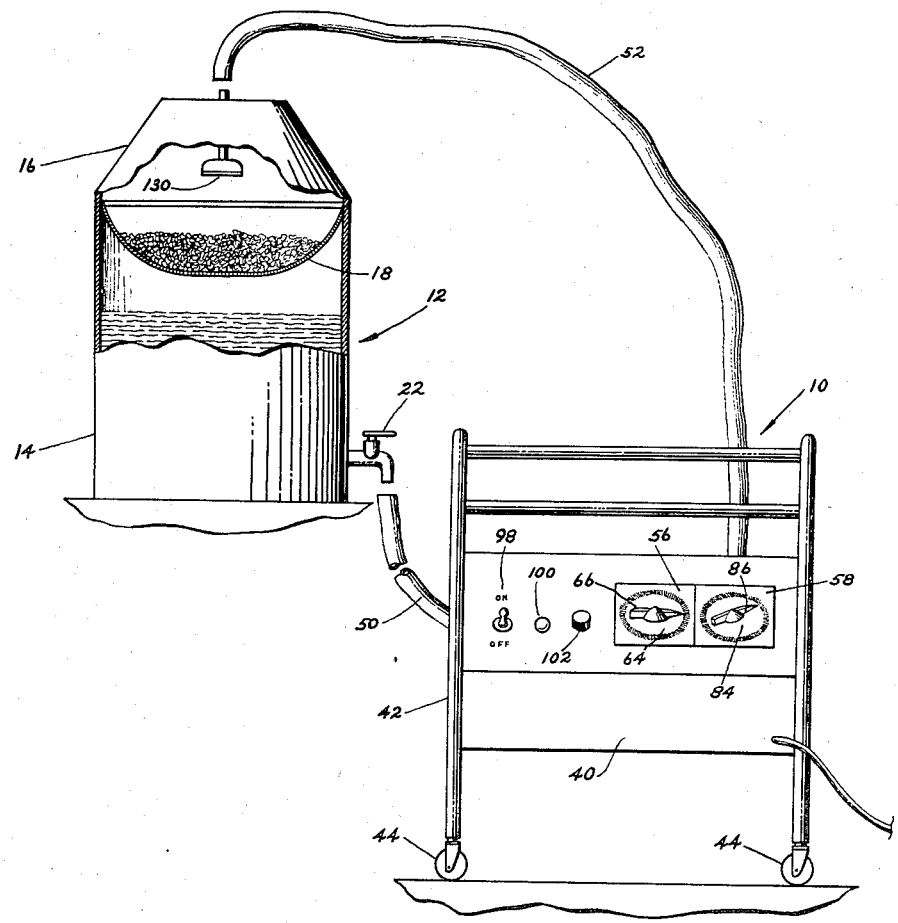
Figure 1 is an elevation view of a coffee making control device constructed in accordance with my invention and suggesting the manner in which it may be used with one form of coffee maker.

In Figure 1, I have shown my coffee brewing controller 10 in association with a tank or urn 12 in which the coffee is to be made. The details of the tank 12 form no part of my invention and will be described only briefly.

The tank 12 includes a cylindrical container 14 and a removable hood or cover 16 which together comprise the case of the coffee maker. Ordinarily, electrical heating units are disposed beneath or in the bottom of the container 14 to heat the water in the tank. A coffee bag 18 ordinarily made of cloth extends across the top of the container 14 and carries the ground coffee beans 20. Coffee is ordinarily made in the urn by withdrawing water out of the bottom of the tank by means of the spicket 22 and pouring it into the top of bag 18 by removing the cover 16. By this means, the water poured into the bag 18 drips through the ground coffee and through the cloth bag into the bottom of the tank. By repeating this operation a number of times, the water originally heated in the tank 14 is converted to coffee. Thereafter, the coffee may be drawn from the tank as desired through the spicket.

For best results, the coffee beans contained within the bag 18 initially should be completely saturated with water. Only if the ground coffee beans 20 are completely saturated will all of the coffee beans be utilized and the maximum coffee flavor be extracted. Once saturated, the strength of the coffee will be determined by the amount of additional water directed through the ground beans. As suggested in the introduction, the total quantity of water may be circulated through the ground coffee one and one half times. My controller 10 is capable of automatically initially saturating the coffee beans 20 in the bag 18 and thereafter supplying additional water at regular intervals to comply with the total flow requirements.

The controls in my device are such that the time for these operations may be varied to suit the particular size of coffee maker employed.

My invention is embodied in a case 40 mounted on a tubular frame 42 supported on wheels 44. The frame and the case are adapted to be moved to any desired location and particularly are adapted to be moved from urn to urn in the establishment in which it is utilized. The case 40 contains the apparatus shown in Figures 3–6 described in the following paragraphs.

Referring to Figure 3, the reader will note that a pump 46 is driven by a motor 48. The pump 46 is used to circulate water through the coffee bag 18 and is provided with an inlet and an outlet (neither shown) which are adapted to be connected respectively to the spicket 22 and a fixture in the hood 16 of the tank. Obviously other connections may be used. Flexible hoses 50 and 52 are shown in Figure 1 and interconnect the spicket 22 and the inlet of the pump, and the outlet of the pump and the cover 16, respectively. Appropriate fittings are used to make the several connections. As these form no part of this invention, they need not be illustrated and described.

The pump 46 which preferably is of the positive displacement type may, for example, have a pumping capacity of 10 gallons per minute and should be driven by a constant speed motor. The positive displacement type pump permits precise control of the amount of water directed through the coffee grounds. Coupled with accurate timers in the motor circuit, complete uniformity of the brewed coffee results each time the device is used.

The motor 48 is controlled by the electrical circuit generally designated 54 in Figure 3. The circuit 54 includes three timers 56, 58 and 60. The timer 56 and the timer 58 each may have a maximum period of 60 minutes and include a synchronous motor and a switch. The timers are of the well known type which either open or close their switches after the expiration of the period set on their scales. The timer 60 may be in the form of a repeat cycle timer having a 60 second period. This repeat cycle timer includes a synchronous motor and a plurality of cam operated switches.

The timer 56 as suggested above includes a switch 62 and a dial 64 which may be manually set, as shown in Figure 1, by the pointer 66 for any shorter period. The switch 62 which forms part of the timer is biased to an open position and remains closed only so long as the timer is running, that is, until the timer runs the full period set by the pointer 66 on the dial. Switch 62 is disposed in the line 68 connecting one side of the motor to the power source. The motor circuit is completed by line 70 which may be a common ground provided by the chassis or case 40.

The timer 56 provides an overall control for the coffee control apparatus and determines the full length of operation of the device. Thus, if the coffee is to be brewed for 15 minutes, the timer 56 is set to run for 15 minutes. The motor of the timer 56 is connected in parallel to the motor 48 which drives the pump, by means of the leads 72 and 74 connected across $L_1$ and $L_2$.

The second timer 58 also connected across the line $L_1$ and $L_2$ by means of leads 76 and 78 and identical to the timer 56 has its switch 80 interrupting the lead 82 which connects one side of the third timer 60 across the line. The timer 58 includes a dial 84 and a pointer 86 on the face of the case 40 identical to that of the first timer. The second timer 58 controls the initial operation of the pump 46 during which time the pump directs enough water into the bag 18 to saturate the ground coffee 20. Thus, if two minutes are required for the pump to direct water out of the tank 14 sufficient to fill the bag 18, the timer 58 will be set for two minutes on the dial 84. The switch 80 which forms part of the timer 58 is normally closed and remains open only so long as the timer 58 is running. After the expiration of the period for saturating the coffee grounds 20 the switch 80 closes as the timer stops.

The third timer 60 which is a repeat cycle timer and has a maximum single cycle period of 60 seconds controls three switches 88, 90 and 92. Each of these switches are cam operated as shown in Figure 4 wherein the timer 60 and its associated parts are shown diagrammatically. For a portion of each one minute cycle of the timer 60, the switch 88 is closed and during the remaining portion of each cycle that switch is open. Switches 90 and 92 make up a double throw switch and thus, one is closed while the other is open during each cycle of the timer. The switches 90 and 80 interrupt the lead 82 connecting one side of the timer 60 to the line. The other side of the timer 60 is connected to the line by means of lead 94. It will also be noted that an alternative connection by means of lead 96 is provided for the first side of the timer 60 and this lead is interrupted by switch 92. Thus, the timer may alternately be energized through lead 82 which is dominated by the timer 58 as well as by the timer 56 through the switch 62, and by the lead 96 which by-passes the switches controlled by the timers 56 and 58.

The circuit 54 for the motor 48 is completed by a manually operated on-off switch 98, a signaling device in the form of a light 100, and a fuse 102. Before discussing the operation of the motor circuit, the operation of the third timer 60 will be described in connection with Figure 4.

The motor of third timer 60 drives a shaft 104 suggested by the broken line, and the shaft carries a pair of cams 106 and 108. Each of these cams may be made of a pair of cam elements 110 and 112 rotatably adjustable with respect to one another on the shaft. This is suggested in Figure 5 wherein the two elements are shown in section. The cam 108 has a cam follower in the form of a wheel 114 supported on a lever arm 116 connected to the blade of switch 88. The cam 108 has two major cam surfaces 118 and 120 over which the cam follower 114 rolls as the cam 108 rotates with the shaft. As the cam follower 114 rides on the surface 120, the switch 88 is closed, and when the follower is on the surface 118, that switch is open. The switch may form part of a conventional double throw microswitch with only one side utilized.

Earlier I have suggested that the cam 108 may be made of two cam elements 110 and 112 as shown in Figure 5. By making the cam of two distinct elements, it is possible to vary the durations of time in which the switch 88 is closed and opened in each cycle. The two elements which may be identical are shown in Figure 4 as being aligned one behind the other with the similar cam surfaces of each element being mated. By rotating one of the cam elements with respect to the other as is shown in Figure 6, the time in each cycle during which switch 88 is closed may be increased. For example, the switch 88 with the cams set as in Figure 4 will be opened and closed for 30 seconds, while with the cam elements set as in Figure 6, the switch will be closed for approximately 40 seconds and open for 20 seconds during each one minute cycle.

The cam 106 may also be made up of two cam elements identical to those shown in Figure 5. These cam elements are so adjusted that only during a small portion of the total cycle of the timer is the cam follower 122 in a raised position, that is, following a low surface on the cam periphery. This surface is shown at 124 while the major surface of the cam is identified by numeral 126. The lever arm 123 of the cam follower 122 connected to the blade comprises double throw switch 90, 92. Thus, when the cam follower lies in the depression at cam surface 124, the switch 90 is closed while the switch 92 is open. During the major portion of the cycle when the cam follower rides on surface 126 the switch 90 is open while the switch 92 is closed.

The cams 106 and 108 are shown in their starting position, that is in the rest position of the timer motor. When the motor is actuated, the cams turn in the direction indicated by the arrows through one revolution each 60 seconds.

Figure 2:
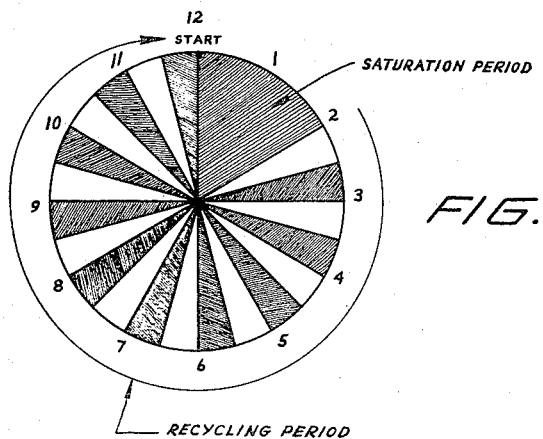
Figure 2 is a diagram which illustrates the operating cycle of my controller.

Having described in detail the operation of the third timer 60, I will now describe the operation of my invention. Assume that the tank 14 is filled to the level indicated with boiling water and that the hose 50 is coupled to the spicket 22 and the hose 52 is connected by a suitable coupling to the spray head 130 secured to the hood 16 above the bag 18 containing the ground coffee beans. Also assume that the amount of coffee to be made and the capacity of the pump necessitates a full brewing period of twelve minutes and a saturation period of two minutes. These times are suggested in the diagram of Figure 2 wherein the full operating cycle is shown to be twelve minutes (the units being minutes), and the saturation period is shown to be of two minutes duration at the start of the flow cycle. The remaining 10 minutes of the cycle identified by the arrow as the recycling period is shown to be divided into one minute periods each of which is subdivided into equal parts of shaded and unshaded areas. The shaded areas indicate flow, that is, operation of the pump 46, while the unshaded areas indicate inactivity on the part of the pump. With these requirements, the operator sets the dial 64 by means of the pointer 66 at the twelve minute marking and sets the pointer 86 of the dial 84 at the two minute marking. With these dials set, the machine is ready to operate and the operator throws the switch 98 to the "on" position. At this time, the cams 106 and 108 are positioned as shown in Figure 4. By turning switch 98 on, the circuit is completed to the motor 48 through switches 98, 62 and 88 in lead 68, for first timer 56 is running and the third timer 60 is in the position shown in Figure 4 with the switch 88 closed. Because the timer 58 is also running, the switch 80 is open and no current is supplied to the third timer 60 through the lead 82. Similarly, switch 92 is open and thus the alternative circuit for the third timer 60 is broken. For the first two minutes of the cycle, the pump 46 draws water out of the container 14 and directs it through the spray head 130 to the coffee bag 18. The operator will know that the machine is operating for the light 100 will glow, being placed across the line by means of the closing of switch 98.

At the expiration of the two minute period, the second timer 58 stops and closes the switch 80. Because in its initial position the switch 90 is also closed, the third timer 60 will be placed across the line through lead 82, and begin cycling. Immediately after the beginning of the operation of the timer 60, the cam follower 114 drops to the surface 118 and opens switch 88. This causes the motor 48 to stop and the pump no longer circulates water in the coffee maker. At the same time, the cam follower 122 rises to the surface 126 of cam 106, opening switch 90 and closing switch 92. The opening of switch 90 and the closing of switch 92 disconnects the third timer 60 from the line L₁ through lead 82 and remakes this connection through lead 46, by-passing switches 98, 62, 80 and 90.

For approximately 30 seconds the switch 88 in the motor circuit will remain open until the cam follower 114 reaches the beginning of surface 120 of the cam 108. At that time, the motor 48 will again be activated and drive the pump to furnish additional water to the bag 18. At the three minute mark shown in Figure 2, the timer 60 will have completed one cycle and the cam follower 122 will drop to the surface 124, reopening switch 90 and closing switch 90. If the circuit at that time is such that switch 62 is still in the closed position, the third timer 60 will start through a second cycle, opening switches 88 and 90 and closing switch 92. The timer 60 will recycle until the expiration of the full cycle period set on the first timer 56. This is suggested in the cycle diagram of Figure 2. When the timer 60 completes a cycle and finds that the switch 62 is open, the timer 60 will cease cycling and the motor 48 will permanently shut down.

It should be noted that the timer 60 through substantially its full cycle is not dependent upon switch 62 but rather is connected directly across the line by lead 96. As a result, if the switch 62 should open due to the expiration of the full timed period set on dial 64 while the third timer 60 is in the middle of one cycle, the timer 60 will continue to operate until it reaches its starting position with the cams in the position shown in Figure 4. When that cycle is completed and the switch 92 is again open, the timer 60 will finally shut down.

The reader will now appreciate that through the circuitry employed, water is intermittently directed to the bag 18 after it is initially saturated. As suggested, the portions of the cycle of timer 60 may be divided in any way by varying the relative positions of the cam elements 110 and 112. Ordinarily, these cams are initially set at one desired position and are left as set. As a result, it is unnecessary to provide a dial on the face of the box 40 to change this preset relationship.

It should be noted that with the circuitry illustrated the initial saturation period may be eliminated from the complete brewing cycle of my device. This may be desirable when an urn is to be used to make a small quantity of coffee or if a relatively small urn is to be controlled by my invention. For example, if it is desired to brew coffee for a total period of twelve minutes and throughout this period the recycling timer 60 is to be employed to alternately shut down and run the pump, the first timer 56 will be set at the twelve minute mark on the dial 64 and the second timer dial 84 will be set at zero. Thus, when the master switch 98 is closed, the motor 48 will run for about one second driving the pump 46. However, because the switch 80 will be closed, the third timer 60 will immediately start to run and the cam 108 will rotate and drop the cam follower 114 to the low surface 118, thereby opening switch 88. Therefore, after approximately one second, the switch 88 will open to shut down the pump. At the same time, the cam 106 will rotate and after the one second period, close switch 92 so that the timer 60 is placed directly across the line. After approximately thirty seconds (with the cam 108 set as shown in Fig. 4) the switch 88 will again close, energizing the motor 48. The pump will then run for the remaining thirty seconds of the one minute cycle period of the third timer 60. The third timer 60 will continue to cycle just so long as the switch 62 is closed by the action of the timer 56. After the timer 56 has run its course, the switch 66 will open and when the third timer 60 completes its cycle, the circuit of lead 82 will sense the open condition of switch 62 and shut down the third timer. This characteristic has been described in detail above.

Those skilled in the art will appreciate that through this device, an operator can consistently make good coffee. All of the advantages set forth in the introduction are accomplished with a relatively simple device which may be manufactured without undue expense. Moreover, the apparatus may be used in other applications remote from the brewing of coffee. The use of the device to control certain chemical processes is readily foreseeable.

Numerous modifications may be made of my invention without departing from its spirit. Therefore, I do not intend to limit this invention to the specific embodiment illustrated and described but rather, it is my intention that the scope of my invention be determined by the appended claims and their equivalents.

What I claim as new and desire to secure by Letters Patent of the United States is:

1. A device of the class described adapted to be used with a coffee making machine having a container and a bag carrying ground coffee in the container; comprising a positive displacement pump, a motor for driving the pump, flexible couplings adapted to connect the inlet of the pump to the bottom of the container and the outlet of the pump to the container above the bag, a circuit for energizing the motor to drive the pump, a first switch in the circuit of the motor, a manually set timer controlling the switch and keeping the switch closed during the period manually set on the timer, a second switch in the circuit, a recycling timer controlling the second switch and opening and closing it during portions of each cycle, a second circuit for energizing the recycling timer, a third switch in the second circuit, and an additional manually set timer for controlling the third switch and maintaining that switch open during the period manually set on the additional timer.

2. A device of the class described adapted to be used with a coffee making machine having a container and a bag carrying ground coffee disposed in the container; comprising a positive displacement pump, a motor for driving the pump, flexible couplings adapted to connect the inlet of the pump to the bottom of the container and the outlet of the pump to the container above the bag, a circuit for energizing the motor to drive the pump, a first switch in the circuit, a first timer controlling the first switch and determining the maximum operating time of the motor, a second switch in the circuit, a second timer alternately opening and closing the second switch for energizing and de-energizing the motor during the maximum operating time of the motor as set by the first timer, a circuit for energizing the second timer, and means including a third switch in the second timer circuit preventing operation of the second timer until after a predetermined period.

3. A device as defined in claim 2 further characterized by said means including the third switch causing the circuit to the motor to remain continuously energized during the predetermined period.

4. A device of the class described adapted to be used with a coffee making machine having a container and a bag within the container carrying ground coffee; comprising a pump, a motor for driving the pump, flexible couplings adapted to connect the inlet of the pump to the bottom of the container and the outlet of the pump to the container above the bag, a circuit for energizing the motor to drive the pump, a normally open switch in said circuit, a first manually set timer for maintaining said switch closed during the set period, a second switch in said circuit, a recycling timer controlling the second switch and adapted to maintain said switch open and closed during alternate periods of each cycle of the recycling timer, a second circuit for energizing said recycling timer, a third switch in said second circuit, and a second timer controlling said third switch maintaining said switch open for a period set on the second timer.

5. A device as defined in claim 4 further characterized by an additional switch in said second circuit and controlled by said recycling timer, said switch being closed by said recycling timer at the beginning of each cycle.

6. A device as defined in claim 5 further characterized by said second circuit being dominated by the first switch.

7. A device as defined in claim 6 further characterized by an additional circuit for energizing said recycling timer and independent of said second circuit and said first switch, and a switch in said additional circuit and controlled by the recycling timer and closed throughout each cycle of the recycling timer when said additional switch is open.

8. A device of the class described comprising a pump, a motor for driving the pump, a circuit for energizing the motor to drive the pump, a first switch in the circuit, a first timer controlling the switch and determining the maximum operating timer of the motor, a second switch in the circuit, a second timer alternately opening and closing the second switch for energizing and deenergizing the motor during the maximum operating time, a circuit for energizing the second timer, and means including a third switch in the second timer circuit preventing operation of the second timer until after a predetermined period.

References Cited in the file of this patent

UNITED STATES PATENTS

| | | |
|---|---|---|
| 1,638,969 | Tinsley | Aug. 16, 1927 |
| 1,774,980 | Lambert | Sept. 2, 1930 |
| 2,019,299 | Fox et al. | Oct. 29, 1935 |
| 2,360,194 | Bright | Oct. 10, 1944 |
| 2,550,093 | Smith | Apr. 24, 1951 |
| 2,667,827 | Peters | Feb. 2, 1954 |